Aug. 27, 1968   W. G. HECKENHAUER   3,398,808
FRONT WHEEL AXLE SUSPENSION

Filed Jan. 4, 1965                     3 Sheets-Sheet 2

INVENTOR.
WILLIAM G. HECKENHAUER
BY Ely, Golrick & Flynn
ATTORNEYS

Aug. 27, 1968  W. G. HECKENHAUER  3,398,808

FRONT WHEEL AXLE SUSPENSION

Filed Jan. 4, 1965  3 Sheets-Sheet 3

INVENTOR.
WILLIAM G. HECKENHAUER
BY *Ely, Bolrick & Flynn*

ATTORNEYS 3,398,808
FRONT WHEEL AXLE SUSPENSION
William G. Heckenhauer, Bucyrus, Ohio, assignor to
Huber Corporation, a corporation of Ohio
Filed Jan. 4, 1965, Ser. No. 423,177
9 Claims. (Cl. 180—79.2)

ABSTRACT OF THE DISCLOSURE

This invention relates to a front wheel lean suspension for a ground vehicle, such as a grader or other off the road vehicle. The lean suspension includes an axle pivotally mounted at its center to the vehicle frame, wheel supports pivotally connected to each end of the axle, a lean tie rod pivotally connected to the wheel supports, and a piston and cylinder connected at one end to the frame and at the other end to one of the wheel supports. The steering arrangement includes a steering tie rod connected to the wheel supports for movement laterally of the vehicle and a power steering unit having a resilient drag link to counteract shocks imparted to the steering system.

---

Vehicles of this general type often are required to run on sloping and/or uneven ground. Under such conditions, with customary axle front wheel suspensions the vehicle chassis can tilt appreciably, and this produces mental and physical strain on the driver. Also, the front tires may be pushed into the chassis of the vehicle or the scraper bar or other ground-working tool carried by the vehicle. Furthermore, in extreme positions of tilt the geometry of the steering linkage may be distorted to such an extent that steering is difficult and bumps or ruts can damage and break the linkage members in a power-assisted steering linkage.

The present invention is directed to a novel front wheel suspension and powered steering arrangement which overcomes these and other disadvantages of prior arrangements on such vehicles.

In accordance with one aspect of the present invention, a novel front wheel suspension is provided which minimizes the tilt of the vehicle frame when traversing inclined or uneven ground. With the present arrangement, both front wheels can be maintained in a substantially vertical plans when riding over uneven or inclined ground, as well as on level ground. Because of this, there is no appreciable tendency of the front tires to rub on the vehicle chassis or the scraper bar or other ground-working tool carried by the vehicle, and a better loading of the tires is obtained. A further advantage of the present suspension is that the driver may set the suspension for any desired angle of lean corresponding to the inclination of the terrain.

Another aspect of this invention is to provide a novel powered steering arrangement on the vehicle having resilient shock-absorbing means which prevents strain on the drag link or excessive wear, disconnection or breakage of any of the bearing connections as a result of shocks due to riding over uneven ground. Also, the present powered steering arrangement automatically compensates for variations in the geometry of the steering linkage and permits accurate control over the steering even when the terrain is such that the steering linkage geometry is greatly distorted.

Accordingly, it is a principal object of this invention to provide a novel and improved front wheel suspension for a ground vehicle.

Another principal advantage of this invention is to provide a novel and improved steering arrangement for such a vehicle.

A further object of this advantage is to provide a novel and improved front wheel suspension and steering arrangement for such a vehicle which substantially overcomes the problems associated with driving the vehicle over uneven or inclined terrain.

Further objects and advantages of this invention will be apparent from the following detailed description of a presently-preferred embodiment thereof, which is illustrated in the accompanying drawings.

Figure 1:
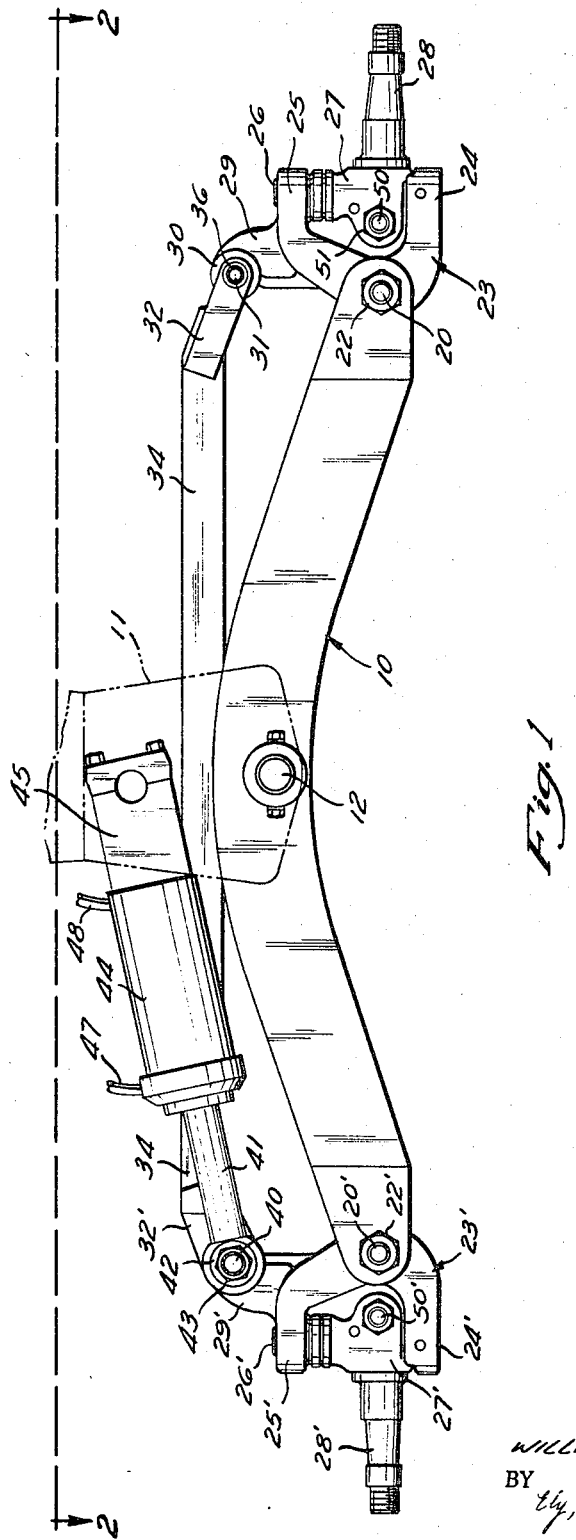
FIGURE 1 is a front elevational view of the present front wheel suspension, with the head of the vehicle frame shown in phantom.
Figure 2:
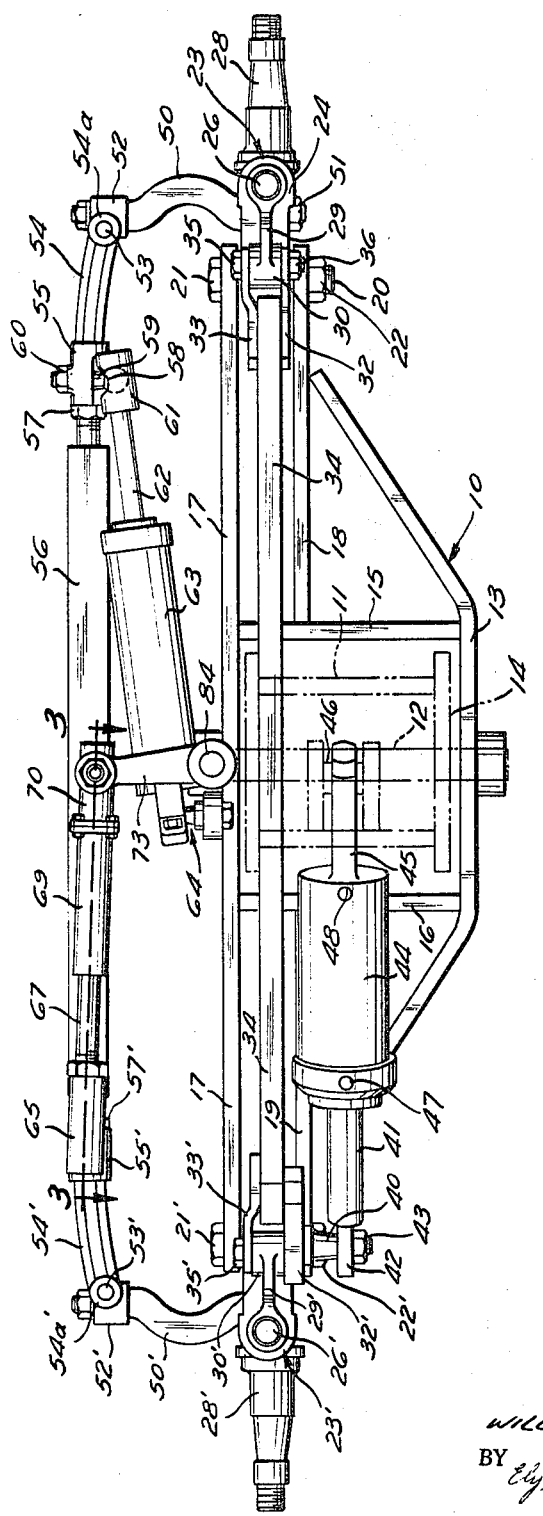
FIGURE 2 is a top plan view showing the front wheel suspension of FIG. 1 and also showing the present steering arrangement.

Referring first to FIGS. 1 and 2, the front wheel suspension shown therein comprises an axle, designated generally by the reference numeral 10, which is pivotally mounted midway between its ends on the frame head 11 of the vehicle by means of a horizontal pivot pin 12 extending along a longitudinal centerline of the vehicle. As shown in FIG. 2, the axle is a rigid unit made up of a front bar 13 extending directly in front of the lower front end 14 of the vehicle frame head and inclined rearwardly and downwardly on opposite sides of the latter, a pair of laterally spaced longitudinal bars 15 and 16 welded to the front bar 13 and extending rearward therefrom on opposite sides of the vehicle frame head, a back bar 17 welded to the back ends of the longitudinal bars 15 and 16 and extending from side to side perpendicular to the longitudinal axis of the vehicle and substantially parallel to the latter, an intermediate bar 18 welded to the longitudinal bar 15 in front of the back bar 17 and extending laterally outwardly substantially parallel to the latter, and another intermediate bar 19 welded to the other longitudinal bar 16 in front of the back bar 17 and extending laterally outward substantially parallel to the latter. The pivot pin 20 is rigidly attached to the vehicle frame, and the longitudinally spaced front and back bars 13 and 17 of the axle are pivotally mounted on this pin in any suitable fashion. The pin thus provides a stable pivotal support for pivotal movement of the axle vertically about the longitudinal centerline of the vehicle.

At its right end in FIGS. 1 and 2, the axle 10 carries a horizontal pivot bolt 20 which extends longitudinally between the back bar 17 and the intermediate bar 18 of the axle in a direction parallel to the pivot pin 12 for the axle. As shown in FIG. 2, this pivot bolt 20 at its back end has an integral head 21, which engages the rear face of the back bar 17. The front end of the pivot bolt 20 is threaded and it carries a nut 22, which engages the front face of the intermediate bar 18 of the axle.

A knuckle yoke 23 is pivotally mounted on the pivot bolt 20, presenting laterally outwardly projecting lower and upper arms 24 and 25. A normally vertical pivot pin 26 extends between the lower and upper arms of the knuckle yoke. A steering knuckle 27 is pivotally mounted on pin 26. The respective pivots 20 and 26 extend perpendicular to each other so that this assembly of the knuckle yoke 23 and the steering knuckle 27 constitutes a universal joint connected to this end of the pivoted axle 10. This steering knuckle has an integral, laterally outwardly extending, horizontal extension 28 on which one of the front wheels (not shown) of the vehicle is mounted in the usual manner. The laterally extending axis of the knuckle extension 28 is horizontally aligned with the longitudinally extending axis of the pivot bolt 20, so that the axis of the wheel will be horizontally aligned with the axis of bolt 20.

The knuckle yoke 23 also has an upwardly projecting, integral extension 29 having an annular sleeve portion 30 at its upper end. This sleeve portion 30 pivotally receives a pivot bolt 31, which extends horizontally and longitudinally of the vehicle. This pivot bolt 31 is carried by a pair of longitudinally spaced, laterally extending plates 32 and 33, which are welded respectively to the front and back faces of a lean tie rod 34. As shown in FIG. 2 the pivot bolt 31 has a head 35 engaging the back of plate 33 and a threaded front end receiving a nut 36 which abuts against the front of plate 32.

When the vehicle is on level ground, the parts assume the positions shown in FIG. 1. At this time the pivot bolt 31 is a slight distance laterally outward beyond (and above) the pivot bolt 20, and the lean tie rod 34 extends substantially horizontally from one side of the vehicle to the opposite side at a level spaced above the pivot pin 12 for the axle 10.

At the opposite side of the vehicle, the axle 10 and the lean tie rod 34 have pivotal connections to a similar knuckle yoke 23' which are identical to those just described, with corresponding elements having the same reference numerals as those already described plus a "prime" superscript. The knuckle yoke 23' at this side is pivotally connected to a steering knuckle 27' having a lateral extension 28' to which the other front wheel of the vehicle is connected. Knuckle yoke 23' and steering knuckle 27' constitute a universal joint connected to this end of the axle 10.

The plate 32', which is rigidly connected to the front of the lean tie rod 34 at this side of the vehicle, carries a forwardly projecting, horizontal pivot pin 40. A piston shaft 41 carries a ring 42 at its outer end which pivotally receives a pin 40. A nut 43 is threaded onto the front end of pin 40 and engages the front face of this ring 42. Piston shaft 41 is attached to a piston (not shown) which is slidable in a lean cylinder 44. The opposite end of cylinder 44 is rigidly attached to one end of a bar 45, whose opposite end is pivotally mounted on a pivot pin 46 carried by the frame head of the vehicle and extending longitudinally of the latter at a location above and offset to the left of the pivot 12 for the axle 10. Hoses 47 and 48 provide fluid communication with the opposite ends of cylinder 44.

Suitable substantially incompressible hydraulic fluid under pressure is supplied via the hoses 47 and 48 to the cylinder 44 so as to normally maintain the parts positioned as selected by the driver of the vehicle. The flow of hydraulic fluid through these hoses to cylinder is controlled by a valve (not shown) under the control of the driver. The piston shaft 41 and its piston, cylinder 44 and its plates 45 constitute a substantially rigid upper, first linkage arm pivotally connected at one end to the knuckle yoke 23' and pivotally connected at the opposite end to the pivot pin 46 on the vehicle frame. This first linkage arm is adjustable in length, simply by supplying hydraulic fluid under pressure to one end or the other of the lean cylinder 44 to change the position of the piston therein.

A rigid lower, second linkage arm is constituted by that portion of the axle 10 which extends between, and is pivotally connected to, the axle pivot pin 12 on the vehicle frame and the pivot bolt 20' for the knuckle yoke 23'.

In FIGS. 1 and 2, the piston in the lean cylinder 44 is so positioned that the length of the upper, first linkage arm between pivots 46 and 40 is equal to the length of the lower, second linkage arm between pivots 12 and 20'. This is the preferred position for use on generally level ground. However, the length of the first linkage arm may be increased or decreased when the vehicle is to operate on the side of a hill or other incline.

The frame of the vehicle provides a rigid third linkage arm between pivots 12 and 46, and the knuckle yoke 23' provides a rigid fourth linkage arm between pivots 20' and 40. The spacing between the pivots 46 and 12 of the third linkage arm is equal to the spacing between the pivot pins 20' and 40 of the knuckle yoke 23', so that the third and fourth end linkage arms are equal in length.

With this arrangement, when the piston in the lean cylinder 44 is positioned to make the upper, first linkage arm equal in length to the lower, second linkage arm, the four linkage arms constitute a parallelogram linkage having two pivotally interconnected pairs of arms, with the opposite arms of each pair being equal in length. In this linkage, the pivots 12 and 46 at one end of the linkage are fixed on the vehicle frame, so that the third linkage arm (constituted by the frame between these pivots) is fixed with respect to the frame. The upper, first linkage arm 41, 44, 45 can pivot about the upper pivot 46, while the lower, second linkage arm (axle 12) between pivots 12 and 20 can pivot about the lower pivot 12. The remaining fourth arm of the linkage (the knuckle yoke 23' between pivots 20' and 40) is constrained to move parallel to the third linkage arm. Throughout such movement, the knuckle yoke maintains the lateral extension 28' of the steering knuckle substantially horizontal. Therefore, while the front wheel at this side is free to move up and down as it moves over bumps or depressions in the ground, its angular position with respect to the vehicle frame remains the same, as determined by the position of the piston in the lean cylinder 44.

However, when operating on an incline, in which one of the front wheels will be continuously higher than the other, the operator of the vehicle can set the linkage to provide a selected lean of the front axle. He does this by applying hydraulic pressure to one end or the other of the lean cylinder 44 so as to shift the piston therein and shorten or lengthen the upper, first linkage arm in the above-described four-sided linkage. Thus, by shifting the lean piston to the right in FIG. 1, he can shorten the upper, first linkage arm and thereby cause the front wheel at that side to lean upward to the right in that figure. Conversely, by shifting the lean piston to the left in FIG. 1, the driver can lengthen the upper, first linkage arm and thereby cause the front wheel at that side of the vehicle to lean upward to the left in that figure. With the lean angle of this front wheel having been set by the driver, the just-described four-sided linkage will maintain the wheel at substantially this same angle as the wheel moves up and down while riding over uneven ground.

At the opposite side of the vehicle, the knuckle yoke 23 is constrained to extend generally parallel to the knuckle yoke 23' at all times. The upper pivot 31 on knuckle yoke 23 is rigidly connected through plates 32, 33, the lean tie rod 34 and plates 32', 33' to the upper pivot 31' on knuckle yoke 23'. The lower pivot 20 on knuckle yoke 23 is rigidly connected through the pivoted axle 10 to the lower pivot 20' on knuckle yoke 23'. Therefore, their respective knuckle yokes 23 and 23' between their respective upper and lower pivots 20, 31 and 20', 31', the lean tie rod 34 and the axle together constitute a four-sided linkage which maintains the respective knuckle yokes substantially parallel to each other at all times. If the wheel at the left side in FIG. 1 is substantially vertical (no lean), then the wheel at the right side will also have no lean, but if the lean piston in cylinder 44 is in position to cause the wheel at the left side to lean in one direction or the other, then the wheel at the right side will lean at substantially the same angle in the same direction.

With this suspension, the frame of the vehicle remains substantially upright, with very little lateral pitch or lean, as it traverses uneven or inclined ground. The centrally pivoted axle 10 enables the front wheels to move up and down with respect to the vehicle frame as they ride over bumps and holes in the ground. The front wheels remain at a substantially constant angle with respect to the vehicle frame, as determined by the position of the piston in the lean cylinder 44, even when the vehicle is operating on inclined ground which is also uneven. Consequently, there is little or no tendency for the front tires to bump into the vehicle chassis or the scraper bar or other ground-working tool carried by the vehicle, and this enables larger front tires to be used. When the vehicle is to be operated on an incline for a substantial time, the driver may set the front wheels to a particular lean angle to compensate for the inclination of the terrain. Tire scuff and rolling over on the sidewalls of the tires when traversing bumps and holes is minimized. The present suspension also reduces the tendency for front end skid out when a high spot is encountered by one front wheel. Except when the front wheels are set to a leaned position (by the setting of the piston in the lean cylinder 44), the front tire loading remains on the central tread axis whether the vehicle is traversing even or uneven ground.

Referring now to the novel steering arrangement of the present invention, at the right side in FIG. 2 a generally horizontal steering arm 50 extends rearward from the steering knuckle 27. This steering arm has an annular shoulder which abuts against the back of the steering knuckle and a reduced diameter stem extending longitudinally through the knuckle and terminating in a screw-threaded front end receiving a nut 41, which engages the front of the knuckle. In this manner the steering arm is rigidly attached to the steering knuckle. This attachment is offset laterally inward from the pivot bolt 26 for the knuckle. Turning movement of the steering arm 50 and the knuckle 27 about the latter's pivot bolt 26 will turn the corresponding front wheel inward or outward.

The back end of the steering arm 50 is similarly attached rigidly to an annular trunnion 52. The trunnion has an upwardly projecting pin 53. A laterally extending steering tie rod member 54 has an annular collar 54a at its outer end which pivotally engages the trunnion pin 53. With this arrangement laterally outward movement of the steering tie rod member 54 will swing the steering arm 50 clockwise in FIG. 2 about the axis of pivot pin 26, causing the front wheel at that side to turn in. Conversely, movement of the tie rod member 54 laterally inward will cause that wheel to turn out.

The opposite (inner) end of the steering tie rod member 54 carries a sleeve 55 having a screw threaded recess in its inner end. An elongated, rigid steering tie rod member 56 has a screw-threaded end which is threadedly received in this recess in sleeve 55. A jam nut 57 on this end of member 56 abuts against the end of sleeve 55 to hold the parts clamped together. By retracting this nut and turning the tie rod member 56, the effective length of the tie rod assembly may be adjusted, so as to provide a toe-in adjustment for the front wheels.

The sleeve 55 also supports the ball member 58 of a conventional ball-and-socket joint. This ball is on the front end of a stem 59 which is threadedly mounted in sleeve 55 and locked in place thereon by a nut 60.

The ball 58 is received in a socket 61 connected to the outer end of a piston shaft 62. Shaft 62 is connected to a piston (not shown) which is slidably disposed in a steering cylinder 63. The opposite end of cylinder 63 is supported from the back bar 17 of the axle 10 by a conventional ball-and-socket joint 64. Steering cylinder 63 is filled with substantially uncompressible hydraulic fluid.

At the opposite side of the vehicle a similar arrangement of steering arm 50', a trunion 52' and steering tie rod member 54' is provided, corresponding elements having the same reference numerals as the elements already described plus a "prime" subscript. The inner end of steering tie rod member 54' carries a sleeve 55', which adjustably receives the screw-threaded opposite end of the elongated steering tie rod member 56. The threads on the opposite ends of the rod member 56 are right-hand and left-hand, respectively, so that the effective length of the tie rod assembly can be shortened or lengthened conveniently without taking apart the steering linkage.

Figure 3:
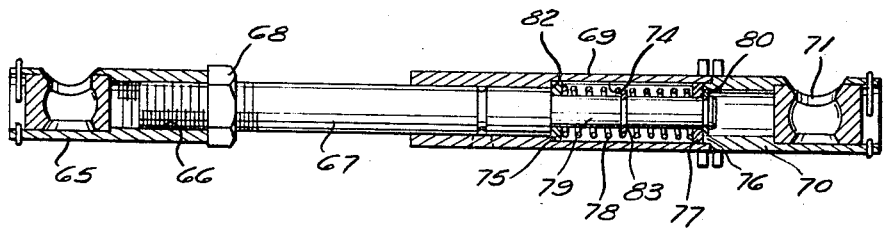
FIGURE 3 is a vertical section taken along the line 3—3 in FIG. 2 through the novel drag link in this steering arrangement.

Sleeve 55' carries the upwardly projecting ball member of a ball-and-socket joint, the socket housing of which is designated by the reference numeral 65 in FIG. 2. This socket housing is part of a drag link which is automatically adjustable in length and is constructed and arranged to absorb shocks. As shown in FIG. 3, this socket housing is a sleeve-like body having a screw-threaded passage 66 at its inner end which threadedly receives a rigid drag link member 67. A jam nut 68 holds these parts assembled together.

The opposite end of drag link member 67 is slidably disposed in a sleeve 69. This sleeve is bolted to the socket housing 70 of a ball-and-socket joint. The socket 71 carried by this housing receives a ball 72 (FIG. 4) on the lower end of a pitman arm 73.

Referring to FIG. 3, the sleeve 69 is formed with a counterbore 74. A thrust washer 75 is seated against the inner end of this counterbore. The socket housing 70 presents a reduced diameter end 76 which projects slightly into the outer end of this counterbore. A thrust washer 77 in the counterbore engages this end of the socket. A coil spring 78 is engaged under compression in the counterbore between the thrust washers 75 and 77 at its opposite ends.

The drag link member 67 has a reduced diameter extension 79 extending slidably through the thrust washers 75 and 77 in the counterbore. This extension 79 of the drag link member carries a snap ring 80 which normally engages the outer end face of thrust washer 77. At the opposite end of its reduced diameter extension 79, the drag link member 67 presents an annular shoulder 82 which normally abuts against the outer end face of thrust washer 75. The reduced diameter extension 79 of the drag link member 67 also carries another snap ring 83 which normally is positioned approximately midway along the counterbore 74.

This assembly of socket 65, member 67, spring 78, sleeve 69 and socket housing 70 constitutes a drag link acting between the tie rod 54, 55, 56, 54', 55' and the pitman arm 73. Spring 78 is engaged under compression between the drag link member 67 and the socket 69 and it yieldably opposes relative movement between them in either direction. Normally, spring 78 positions members 67 and 69 as shown in FIG. 3. The spring provides a relatively stiff, but yieldable or resilient, coupling between the drag link member 67 and the socket 71. Longitudinal movement of the drag link member 67 in either direction normally will be imparted through the spring 78, sleeve 69 and the socket housing 70 to socket 71, and vice versa. Such movement of socket 71, acting through ball 72, will turn the pitman arm 73 (FIG. 4) in one direction or the other. Conversely, rotation of the pitman arm 73 normally will produce a corresponding lateral movement of the drag link member 67.

Figure 4:
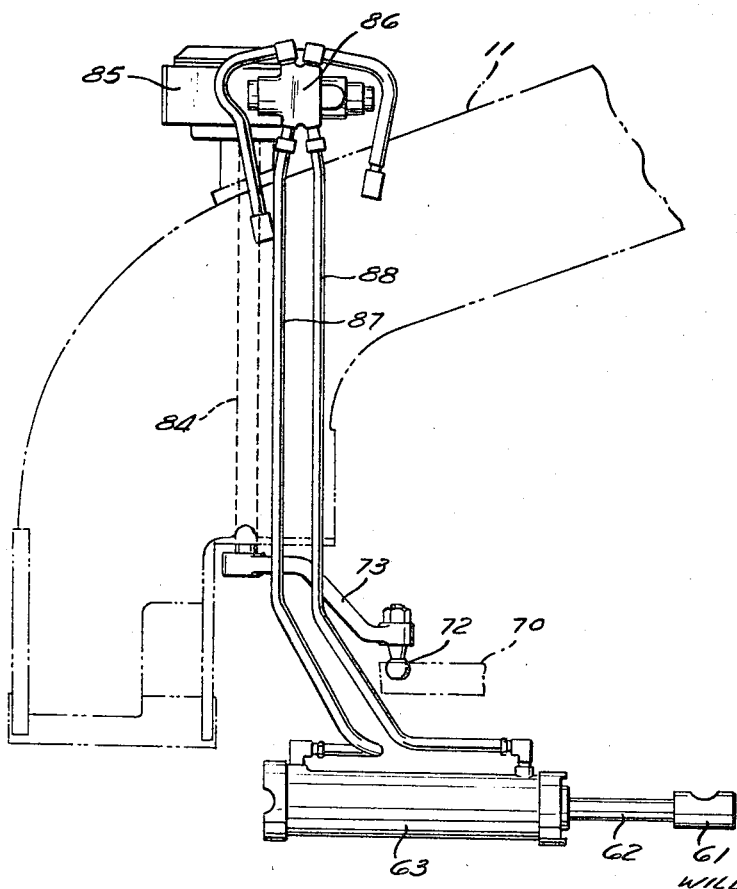
FIGURE 4 is a side elevational view showing the connections of this drag link and of the steering cylinder to a conventional power steering unit on the vehicle, with the head of the vehicle frame shown in phantom.

As shown in FIG. 4, the opposite end of the pitman arm 73 is rigidly connected to the lower end of a vertically extending, rotatable servo shaft 84. The upper end of this servo shaft is connected to a steering gear (not shown) which is rotatably mounted inside a housing 85. This gear is part of a known power steering unit on the vehicle, which is not part of the present invention and therefore is not shown in detail. This steering gear coacts with the steering shaft of the vehicle. The steering shaft also controls a valve 86, also of known design, which controls the flow of hydraulic fluid through hoses 87 and 88 to and from the opposite ends of the steering cylinder 63.

In the normal power steering operation of the vehicle, when the operator of the vehicle turns the steering wheel in one direction or the other, the steering shaft turns the steering gear inside housing 85 and also operates valve 86 to provide the proper fluid supply and return connections to the hoses 87 and 88 connected to the opposite ends of the steering cylinder 63. The piston in this cylinder moves under hydraulic pressure in the appropriate direction to turn the front wheels in the direction called for by the steering wheel through the linkage provided by piston shaft 62, ball and socket joint 58, 61, the steering tie rod 56, 55, 55', 54, 54', trunnions 52, 52', steering arms 50 and 50', and steering knuckles 27 and 27'. The turning of the steering gear in housing 85 causes servo shaft 84 and pitman 83 to turn in the same direction as the steering arms 50 and 50'. Therefore the stiff, but resilient, drag link 70, 69, 78, 67 between the pitman ball-and-socket joint 72, 71 and the ball-and-socket joint at 65 moves laterally in the same general direction as the steering tie rod.

If one of the front wheels strikes the side of a rock or other obstacle, which would tend to displace that wheel sideways from the direction it has been traveling, this force will be transmitted back through the steering knuckle 27 or 27', the steering arm 50 or 50', the tie rod, and the ball-and-socket joint at 65 to the drag link member 67, displacing the latter laterally of the vehicle. The shock of this force is cushioned by the spring 78, but the force is transmitted through this spring to the sleeve 69 and from there through the ball-and-socket joint 72, 71 to the pitman arm 73. The pitman turns, as does the servo shaft 84, which turns the steering gear in housing 85 to shift the position of the steering shaft. The latter operates valve 86 to apply fluid pressure against the piston in the steering cylinder so as to turn the wheel into the obstruction. This restores the vehicle to substantially the same direction it had before its front wheel encountered the obstruction.

As already pointed out, the spring 78 absorbs the shock under these circumstances and thereby avoids bending or stretching of the drag link or disconnection or breakage of any of the ball-and-socket joints associated with the tie rod, the drag link and the steering cylinder.

Another important advantage of this spring is that it permits the automatic lengthening or shortening of the drag link acting between the tie rod and the pitman arm 73 and thereby enables the operator to steer the vehicle accurately despite distortions of the geometry of the steering linkage when the vehicle is in extreme position of tilt.

Thus, if the steering geometry requires this drag link to be lengthened, the drag link member 67 can slide to the left with respect to the sleeve 69 in FIGS. 2 and 3, compressing spring 78 further. Conversely, if the steering geometry requires that this drag link be shortened, the drag link member 67 can slide to the right with respect to sleeve 69 in these figures, compressing spring 78 further in that direction.

From the foregoing description it will be apparent that the particular front wheel suspension and steering arrangement which is illustrated in the accompanying drawings is particularly advantageous in overcoming the difficulties associated with prior arrangements of this general type. However, while a specific presently-preferred embodiment of this invention has been shown and described, it is to be understood that the invention is susceptible of other embodiments and that various modifications, omissions and refinements which depart from the disclosed embodiment may be adopted without departing from the spirit and scope of the present invention.

What is claimed is:

1. A front wheel suspension for a vehicle having front wheels at the opposite sides thereof, said suspension comprising:

a rigid front axle extending from side to side at the front of the vehicle and pivotally supported midway between its ends from the vehicle frame;

a pair of universal joint means pivotally connected to the opposite ends of said axle and having provision for attachment of the respective front wheels thereto;

a single lean tie rod means unconnected to and movable with respect to said frame and axle but extending between and pivotally connected at its opposite ends to said universal joint means in spaced relation to the pivotal connections of the axle thereto;

and linkage arm means pivotally connected at one end to the vehicle frame at a location spaced from the pivotal mounting of the axle thereon and pivotally connected at its opposite end to one of said universal joint means at a location spaced from the pivotal connection of the axle thereto, said linkage arm means completing a four-sided linkage between the vehicle frame and said last-mentioned universal joint means which maintains the latter in substantially the same angular position with respect to the vehicle frame as the front wheels ride over uneven ground;

said lean tie rod, said axle and said pair of universal joint means constituting a four-sided pivoted linkage which maintains the other of said universal joint means in substantially the same angular position with respect to the vehicle frame as the front wheels ride over uneven ground.

2. A front wheel suspension for a vehicle having front wheels at the opposite sides thereof, said suspension comprising:

a rigid front axle extending from side to side at the front of the vehicle and pivotally mounted midway between its ends on the vehicle frame;

a pair of universal joint means pivotally connected to the opposite ends of said axle and having wheel support members;

a rigid single lean tie rod means unconnected to and movable with respect to said frame and axle but extending between and in spaced relation above said axle, said lean tie rod having pivotal connections at its opposite ends to said universal joint means at locations spaced above the pivotal connections of the axle thereto;

and adjustable length linkage arm means pivotally connected at one end to the vehicle frame at a location spaced above the pivotal mounting of the axle thereon and pivotally connected at its opposite end to one of said universal joint means at a location spaced above the pivotal connection of the axle thereto, said linkage arm means completing a four-sided linkage between the vehicle frame and said last-mentioned universal joint means which maintains the latter in substantially the same angular position with respect to the vehicle frame as the front wheels ride over uneven ground;

said lean tie rod, said axle and said pair of universal joint means constituting a four-sided pivoted linkage which maintains the other of said universal joint means in substantially the same angular position with respect to the vehicle frame as the front wheels ride over uneven ground;

said linkage arm means comprising a fluid pressure cylinder and a piston slidably disposed therein for adjustment by fluid pressure to selectively change the length of said linkage arm means and thereby adjust the angularity of said universal joint means with respect to the vehicle frame, so as to determine the lean of the front wheels.

3. The suspension of claim 2 wherein each of said universal joint means comprises:

a knuckle yoke, a horizontal lower pivot means on said knuckle yoke extending longitudinally of the vehicle and pivotally connecting the knuckle yoke to the axle, a horizontal upper pivot means on said knuckle yoke extending longitudinally of the vehicle at a location spaced above said lower pivot means and pivotally connecting the knuckle yoke to the lean tie rod, said knuckle yoke having laterally outwardly projecting, vertically spaced, upper and lower arms;

and a steering knuckle disposed between said arms and pivotally connected to the latter for pivotal movement about an axis extending substantially perpendicular to the axis of said lower pivot means, said steering knuckle having a laterally outwardly projecting extension for mounting the respective front wheel.

4. A front wheel suspension for a vehicle having front wheels at opposite sides thereof, said suspension comprising:

a rigid front axle extending from side to side at the front of the vehicle;

a horizontal pivot pin carried by the vehicle frame along a longitudinal centerline of the vehicle and supporting said axle midway between its ends for pivotal movement with respect to the vehicle frame;

first and second knuckle yokes at the opposite ends of the axle, a lower pivot means at each knuckle yoke extending horizontally and longitudinally of the vehicle and pivotally connecting the respective knuckle yoke to the axle;

each of said knuckle yokes having laterally outwardly projecting, vertically spaced, upper and lower arms, a steering knuckle disposed between said arms and pivotally connected to the latter for pivotal movement about an axis extending substantially perpendicular to said lower pivot means, said steering knuckle having a laterally outwardly projecting extension for mounting a wheel;

an upper pivot means at each knuckle yoke extending horizontally and longitudinally of the vehicle at a location spaced above said lower pivot means thereon, a rigid lean tie rod extending from side to side across the vehicle above said axle and pivotally connected at its opposite ends to said upper pivot means on the respective knuckle yokes;

a lean cylinder having a slidable piston therein, means pivotally mounting said cylinder on the vehicle frame for pivotal movement about an axis extending horizontally and longitudinally of the vehicle at a location above said pivot pin for the axle, a piston slidable in said cylinder, and a piston shaft connected at one end to said piston and extending from said cylinder, means pivotally connecting the opposite end of said piston shaft to one of said knuckle yokes at a location on the latter which is spaced above said lower pivot means thereon a distance substantially equal to the spacing between said pivotal mounting means for the lean cylinder and said pivot pin for the axle, said piston being shiftable by fluid pressure in the cylinder to adjust the spacing between said pivotal mounting means for the lean cylinder and the pivotal connection of the piston to said last-mentioned knuckle yoke, whereby to selectively adjust the lean of both front wheels with respect to the vehicle frame.

5. A front wheel suspension and steering arrangement for a vehicle having front wheels at the opposite sides thereof and a power steering unit which is operable by the driver of the vehicle, said arrangement comprising:

a front axle extending from side to side at the front of the vehicle and pivotally mounted midway between its ends from the vehicle frame;

a pair of universal joint means pivotally connected to the opposite ends of said axle and having provision for attachment of the respective front wheels thereto;

a lean tie rod extending from side to side across the vehicle and pivotally connected at its opposite ends to said universal joint means in spaced relation to the pivotal connections of the axle thereto;

linkage arm means pivotally connected at one end to the vehicle frame at a location spaced from the pivotal mounting of the axle thereon and pivotally connected at its opposite end to one of said universal joint means at a location spaced from the pivotal connection of the axle thereto, said linkage arm means completing a four-sided linkage between the vehicle frame and said last-mentioned universal joint means which maintains the latter in substantially the same angular position with respect to the vehicle frame as the front wheels ride over uneven ground;

said lean tie rod, said axle and said pair of universal joint means constituting a four-sided pivoted linkage which maintains the other of said universal joint means in substantially the same angular position with respect to the vehicle frame as the front wheels ride over uneven ground;

a steering tie rod coupled between said universal joint means and movable laterally of the vehicle to turn the front wheels;

a steering cylinder and piston coupled to said steering tie rod and operable by said power steering unit for selectively positioning said steering tie rod laterally of the vehicle to control the steering direction of the front wheels;

and drag link means acting between said steering tie rod and said power steering unit to impart the movement of the one to the other, said drag link means having resilient means therein.

6. A front wheel suspension and steering arrangement for a vehicle having front wheels at the opposite sides thereof and a power steering unit which is operable by the driver of the vehicle, said arrangement comprising:

a rigid front axle extending from side to side at the front of the vehicle and pivotally supported midway between its ends from the vehicle frame;

a pair of universal joint means pivotally connected to the opposite ends of said axle and having turnable supports for the respective front wheels of the vehicle;

a lean tie rod extending from side to side across the vehicle and pivotally connected at its opposite ends to said universal joint means in spaced relation to the pivotal connections of the axle thereto;

linkage arm means pivotally connected at one end to the vehicle frame at a location spaced from the pivotal mounting of the axle thereon and pivotally connected at its opposite end to one of said universal joint means at a location spaced from the pivotal connection of the axle thereto, said linkage arm means coupling a four-sided linkage between the vehicle frame and said last-mentioned universal joint means which maintains the latter in substantially the same angular position with respect to the vehicle frame as the front wheels ride over uneven ground;

said lean tie rod, said axle and said pair of universal joint means constituting a four-sided pivoted linkage which maintains the other of said universal joint means in substantially the same angular position with respect to the vehicle frame as the front wheels ride over uneven ground;

a steering tie rod extending from side to side across the vehicle and having pivotal connections to said wheel supports and movable laterally of the vehicle to turn said supports;

a steering cylinder and piston pivotally coupled to said steering tie rod and operable by said power steering unit for relatively positioning said steering tie rod laterally of the vehicle to control the steering direction of the front wheels;

and drag link means acting between said steering tie rod and said power steering unit to impart the movement of the one to the other, said drag link means being pivotally coupled at one end to said steering tie rod and having a pivotal coupling at its opposite end to said power steering unit, said drag link comprising members slidable relative to one another to lengthen or shorten the drag link and spring means acting between said members to yieldably oppose relative movement between them in either direction.

7. The arrangement of claim 6, wherein there is provided means for selectively adjusting the length of said linkage arm means to set the angular relationship of the front wheels with respect to the vehicle frame.

8. A front wheel suspension and steering arrangement for a vehicle having front wheels at the opposite sides thereof and a power steering unit which is operable by the driver of the vehicle, said arrangement comprising:

a rigid front axle extending from side to side at the front of the vehicle and pivotally mounted midway between its ends on the vehicle frame;

a pair of universal joint means pivotally connected to the opposite ends of said axle and having wheel support members;

a rigid lean tie rod extending from side to side across the vehicle in spaced relation above said axle, said lean tie rod having pivotal connections at its opposite ends to said universal joint means at locations spaced above the pivotal connections of the axle thereto;

adjustable length linkage arm means pivotally connected at one end to the vehicle frame at a location spaced above the pivotal mounting of the axle thereon and pivotally connected at its opposite end to one of said universal joint means at a location spaced above the pivotal connection of the axle thereto, said linkage arm means completing a four-sided linkage between the vehicle frame and said last-mentioned universal joint means which maintains the latter in substantially the same angular position with respect to the vehicle frame as the front wheels ride over uneven ground;

said lean tie rod, said axle and said pair of universal joint means constituting a four-sided pivoted linkage which maintains the other of said universal joint means in substantially the same angular position with respect to the vehicle frame as the front wheels ride over uneven ground;

said linkage arm means comprising a fluid pressure cylinder and a piston slidably disposed therein for adjustment by fluid pressure to selectively change the length of said linkage arm means and thereby adjust the angularity of said universal joint means with respect to the vehicle frame, so as to determine the lean of the front wheels;

a steering tie rod extending from side to side across the vehicle behind said axle and having pivotal connections to said wheel support members, said steering tie rod being movable laterally of the vehicle to turn said wheel support members;

a steering cylinder and piston pivotally coupled to said steering tie rod and operable by said power steering unit for selectively positioning the steering tie rod laterally of the vehicle to control the steering direction of the front wheels;

and drag link means acting between said steering tie rod and said power steering unit to impart the movement of the one to the other, said drag link means being pivotally coupled at one end to said steering tie rod and having a pivotal coupling at its opposite end to said power steering unit, said drag link means comprising members slidable relative to one another to lengthen or shorten the effective length of the drag link means and spring means acting between said members to yieldably opposite relative movement between them in either direction.

9. A front wheel suspension and steering arrangement for a vehicle having front wheels at opposite sides thereof and a power steering unit which is operable by the driver of the vehicle, said arrangement comprising:

a rigid front axle extending from side to side at the front of the vehicle;

a horizontal pivot pin carried by the vehicle frame along a longitudinal centerline of the vehicle and supporting said axle midway between its ends for pivotal movement with respect to the vehicle frame;

first and second knuckle yokes at the opposite ends of the axle, a lower pivot means at each knuckle yoke extending horizontally and longitudinally of the vehicle and pivotally connecting the respective knuckle yoke to the axle;

each of said knuckle yokes having laterally outwardly projecting, vertically spaced, upper and lower arms, a steering knuckle disposed between said arms and pivotally connected to the latter for pivotal movement about an axis extending substantially perpendicular to said lower pivot means, said steering knuckle having a laterally outwardly projecting extension for mounting a wheel;

an upper pivot means at each knuckle yoke extending horizontally and longitudinally of the vehicle at a location spaced above said lower pivot means thereon, a rigid lean tie rod extending from side to side across the vehicle above said axle and pivotally connected at its opposite ends to said upper pivot means on the respective knuckle yokes;

a lean cylinder having a slidable piston therein, means pivotally mounting said cylinder on the vehicle frame for pivotal movement about an axis extending horizontally and longitudinally of the vehicle at a location above said pivot pin for the axle, a piston slidable in said cylinder, and a piston shaft connected at one end to said piston and extending from said cylinder, means pivotally connecting the opposite end of said piston shaft to one of said knuckle yokes at a location on the latter which is spaced above said lower pivot means thereon a distance substantially equal to the spacing between said pivotal mounting means for the lean cylinder and said pivot pin for the axle, said piston being shiftable by fluid pressure in the cylinder to adjust the spacing between said pivotal mounting means for the lean cylinder and the pivotal connection of the piston to said last-mentioned knuckle yoke, whereby to selectively adjust the lean of both front wheels with respect to the vehicle frame;

a pair of rigid steering arms connected respectively to said knuckles and extending rearward from the latter;

a rigid steering tie rod extending from side to side across the vehicle behind said axle and at its opposite ends having pivotal connections to said steering arms for turning the latter and said steering knuckles in response to lateral movement of the steering tie rod;

a steering cylinder having a ball-and-socket support at one end on the vehicle and having a piston slidable therein, a piston shaft connected to said piston and extending from the opposite end of said steering cylinder and having a ball-and-socket connection to said steering tie rod, said steering cylinder having fluid connections to said power steering unit for the selective positioning of said last-mentioned piston by said power steering unit to thereby determine the position of said steering tie rod laterally of the vehicle so as to control accordingly the steering direction of the front wheels;

and a drag link having a ball-and-socket connection at one end to said steering tie rod at its opposite end having a pivotal coupling to said power steering unit, said drag ling including interfitting members slidable lengthwise with respect to one another and spring means engaged under compression between said members and yieldably opposing relative movement between them in either direction.

References Cited

UNITED STATES PATENTS

| | | | |
|---|---|---|---|
| 1,927,679 | 9/1933 | Brick | 35—157 |
| 2,247,345 | 7/1941 | Arndt | 280—80 |
| 2,624,415 | 1/1953 | Moore | 280—64 |
| 2,625,232 | 1/1953 | Lado | 180—79.2 |
| 2,902,100 | 9/1959 | Leliter | 280—80 |
| 3,049,187 | 8/1962 | Medley et al. | 180—79.2 |
| 3,254,737 | 6/1966 | Wichmann et al. | 180—79.2 |

BENJAMIN HERSH, *Primary Examiner.*

JOHN A. PEKAR, *Assistant Examiner.*